United States Patent Office 3,083,069
Patented Mar. 26, 1963

3,083,069
PROCESS FOR THE DYEING OF POLY-
PEPTIDE FIBRES
Hans-Rudolf Hirsbrunner, Basel, and Alfred Schaeuble, Riehen, near Basel, Switzerland, assignors to J. R. Geigy A.-G., Basel, Switzerland
No Drawing. Filed Aug. 31, 1960, Ser. No. 53,046
Claims priority, application Switzerland Sept. 2, 1959
5 Claims. (Cl. 8—54)

The invention concerns a process for the level dyeing of polypeptide fibres by a quick, time-saving process using neutral to weakly acid drawing wool dyestuffs which, under the usual dyeing conditions tend to dye unevenly because of their slight migratory powers. The invention also concerns, as industrial product, the material evenly dyed by the new method.

It is known that the neutral to weakly acid drawing wool dyestuffs produce particularly wet fast dyeings, but the so-called migratory powers of these dyestuffs is very slight when they have once been drawn onto the substratum. This property makes the levelling of uneven dyeings in the boiling dyebath more difficult. Thus, on dyeing with these dyestuffs, care must be taken to avoid a quick and uneven drawing onto the textile fibres. This can be attained by slowly raising the temperature on dyeing and slowly reducing the pH of the boiling liquor. At the first glance it would seem that dyestuffs of this type are unusable in a quick dyeing process.

Suprisingly it has now been found that polypeptide fibres, particularly wool and synthetic polyamide fibres, can be dyed very evenly with neutral to weakly acid drawing wool dyestuffs by a quick, time and energy saving process if, at temperatures under the drawing temperature of the dyestuffs, the goods to be dyed which have possibly been impregnated with thickened dyestuff solutions to develop the dyeing, are introduced into a bath, the temperature of which is at least 50° C. to boiling, which contains dilute acid and at least one organic solvent which is liquid under the dyeing conditions. This organic solvent wets the goods to be dyed, at least partially dissolves the dyestuff, is at least partially dissolved or emulsified in the aqueous bath and mixes with water at room temperature but not in all proportions.

Preferred methods of application of the invention consist in using dyesuff solutions thickened with soluble salts of alginic acid, which solutions contain ester- or amide-like condensation products of fatty acids having 8 to 16 carbon atoms and alkanol amines, as impregnating liquor and in using in the hot acid development bath, organic solvents containing alcoholic hydroxyl groups which are not miscible in all proportions with water; also in using neutral to weakly acid drawing dyestuffs containing heavy metal which contain two identical or different metallisable dyestuffs of the azo and azomethine series bound to one chromium or cobalt atom and which contain at most one sulphonic acid group per dyestuff molecule containing heavy metal bound in complex linkage, which dyestuffs otherwise are substituted by the usual groups increasing water solubility, for example by sulphonic acid amide groups including those substituted at the nitrogen atom by low organic radicals, by low alkyl sulphonyl groups and by low acylamino groups including those low acylamino groups derived from low molecular organic sulphonic acids.

In addition to the preferred heavy metal-containing dyestuffs of the type two dyestuff molecules co-ordinated to one heavy metal atom, to produce fast dyeings by the process according to the invention in the second place the so-called acid milling dyestuffs for wool can be used such as, e.g. those defined by T. Vickerstaff, The Physical Chemistry of Dyeing, 2nd Edition, London, 1954, p. 379, in particular acid dyestuffs of the azo series and also those of triarylmethane or diarylindolylmethane, and anthraquinone series which are distinguished by great affinity for wool in a weakly acid bath; in the third place possibly also ordinary acid dyestuffs can be used, for example, azo, anthraquinone, nitro and phthalocyanine dyestuffs. The content of dyestuff in the impregnating liquor depends on the deepness of shade desired. For example, it can be from 10 to 60 g. of dyestuff per litre. If the water solubility of the dyestuffs is insufficient, then the use of organic solubility promoters which are miscible witth water such as low alkoxyalkanols, can be of service (particularly if unsulphonated dyestuffs containing chromium or cobalt bound in complex linkage are used).

The other thickeness usual in printing can be used instead of the preferred alginate thickeners or combined therewith, for example the alkali metal salts of cellulose glycolic acids, alkyl celluloses and the soluble vegetable gum.

The ester- or amide-like condensation products of fatty acids having 8-16 carbon atoms with alkanolamines are also an important component of the impregnating liquor, for example the reaction products of U.S. Patent No. 2,089,212 from a mixture of copra fatty acid and di- and tri-ethanolamines. These prevent the dyestuffs from bleeding in the hot acid development bath; but because they also increase the fixing time, they should not be used in any amounts desired but an amount adapted to the case in question should be used. Amounts of 5 to 20 g. per litre produce good results.

The acid development bath can contain strong inorganic or strong organic acids, for example, sulphuric acid, phosphoric acid, alkyl or aryl sulphonic acids, formic acid, lactic acid, chloroacetic acid, sulphoacetic acid, in amounts of 2 to 8 g. per litre depending on the circumstances. The acid development bath can also contain the neutral salts usual in dyeing, for example, Glauber's salt or sodium chloride. According to the invention, it must always contain an organic solvent which is liquid under the dyeing conditions and which wets the goods. Advantageously, the organic solvent is put into the acid development bath, but, when no losses have to be replaced, it can be added continuously, for example, to the impregnating liquor. The organic solvents which can be used have a certain solubility power for the dyestuffs used for dyeing and, if possible, should be themselves somewhat water soluble and yet not miscible with water in all proportions at room temperature. An optimal action is attained when the concentration of the organic solvent in the acid development bath has reached the saturation point of its solubility in water. Thus, depending on the circumstances, the development bath contains 1–600 g. of organic solvent per litre. If, for example, benzyl alcohol is used as solvent, then the content is advantageously 40–60 g. per litre. If the water solubility is insufficient, the organic solvents can also be emulsified in the acid bath with inert emulsifying agents which are stable to acid or they can be used mixed with water soluble organic solvents. For practical reasons, these latter organic solvents should also be as little volatile as possible under the working conditions. Preferred organic solvents contain alcoholic hydroxyl groups and so large organic radicals that their water solubility is limited. Examples are the butanols, pentanols, hexanols, including cyclohexanols, the arylalkanols and aryloxyalkanols possibly further substituted in the aryl radical by halogen, alkyl or alkoxy groups ,such as phenylmethanols or phenylethanols, phenoxyethanols or phenoxypropanols, also certain alkoxyalkanols, for example alkoxyethanols having more than 3 carbon atoms or alkoxyalkanols which in all have more than 5 carbon atoms such as, e.g. butoxyethanols or propoxybutanol. The preferred chosen agent however, is benzyl alcohol. In addition to the organic solvents mentioned, also esters of aliphatic hydroxy acids such as the esters of lactic or tartaric acid, partially water soluble higher ketones, phenols, aromatic aldehydes such as salicylaldehyde, aromatic or aliphatic chlorohydrocarbons, aliphatic aldehydes and aldehyde hydrates such as chloral, aromatic alkyl or alkoxy hydrocarbons can be used in which case, as has been mentioned, acid stable emulsifying agents or organic water soluble solubility promoters should also be used if the water solubility of the organic solvent is too slight.

After the goods have been impregnated with the dyestuff solution which has possibly been thickened, the excess impregnating liquor is squeezed out to a constant content. It is advantageous if the impregnated goods are then dried in a lay-on-air dryer at temperatures of up to 200° C. or steamed. The dye goods so previously treated are then passed through the acid development bath, which is advantageously boiling, either in batches or continuously. The reverse procedure can also be followed by first performing the acid development and then steaming. If the goods have first been steamed, then the following treatment in the acid development bath can be performed at lower temperatures, for example at 50–80° C.

In most cases one minute in the boiling acid bath is sufficient to develop the dyeings. This development time depends to a great extent on the properties of the dyestuffs used and on the depth of shade of the dyeing and can be up to at most 5 minutes. After the acid developement of the dyeing, the thickener is washed out, advantageously using acid stable washing agents such as higher alkylated aryl sulphonic acids. The goods are then rinsed and dried. In this way, very level, well fixed dyeings in strong shades are obtained.

Quick dyeing methods for wool have already been suggested which recommended the development of the dyeing in a boiling acid bath of wool impregnated with dyestuff solutions. These processes however, have not attained any practical importance because insuperable difficulties or uneconomic losses in strength occur either due to the bleeding of the dyestuff in the acid development bath or because the dyestuff is insufficiently fixed in fixing times of less than 30 minutes. Only by the expedient according to the invention consisting in adding certain organic solvents to the acid fixing bath, has it been possible to attain perfect wool dyeings in a shortened dyeing time by a continuous process.

The subject of this invention, therefore, is a process for the dyeing of polypeptide fibres with neutral to weakly acid drawing wool dyestuffs, said process comprising the steps of (a) impregnating the polypeptide fibres at a temperature within the range of from room temperature to 70° C. with a liquor containing at least one of said neutral to weakly acid drawing wool dyestuffs, (b) squeezing out excess dye liquor from the impregnated goods by pressing and (c) developing the dyeing by the application of an acid shock by entering the impregnated goods into an at least 50° C. hot developing bath containing dilute acid and at least one organic compound which is a solvent for the dye, which solvent is liquid on the conditions of dyeing, wets the goods, is at least partially dissolved or emulsified in the aqueous bath and does not mix with water in all proportions at room temperature, and withdrawing the developed dyeing from said developing bath at the end of a period of at most five minutes.

The new process is suitable principally for the dyeing of wool and of synthetic polyamide fibres such as nylon and Perlon. However, also other natural or synthetic polypeptide fibres such as silk and synthetic polyurethane fibres can be continuously dye with good results.

Further details regarding the performance of the process according to the invention can be seen from the following examples. Where not otherwise expressly stated, parts are given therein as parts by weight. The temperatures are in degrees centigrade. The relationship of parts by weight to parts by volume is as that of kilogrammes to litres.

*Example 1*

Dry wool gabardine is impregnated in a foulard at 50° C. with a solution consisting of 37.5 parts of the grey dyestuff [1 Cr atom+2 molecules of (1-amino-2-hydroxy-5-methyl sulphonyl benzene → 1-acetylamino-7-hydroxynaphthalene)],
5.0 parts of sodium alginate,
5.0 parts of benzyl alcohol,
5.0 parts of dispersing agent (obtained by condensation of a mixture of copra fatty acid with 2 mols of diethanolamine),
947.5 parts of water.

The fabric is squeezed out between rubber rollers until the increase in weight is 75% of that of the original and is then dried immediately. It is then passed for one minute through a lightly boiling development bath which contains 2 g. of formic acid 85% and 60 g. of benzyl alcohol per litre. The thickener is then washed out at 50° C. with a solution of 3 g./litre of the sodium salt of dodecylbenzene sulphonic acid. The fabric is rinsed cold and dried. A level, dark grey dyeing is obtained. Compared with a gabardine dyeing produced under normal conditions, this dyeing has unchanged wet fastness properties.

If, under otherwise the same conditions, the development bath contains only 2 g. of formic acid 85% per litre, then a dyeing which is more than 20% lighter and which is not fully developed is obtained. This dyeing has worst fastness properties.

*Example 2*

Dry wool slubbing is impregnated in a foulard with a 60° warm solution consisting of 10 parts of the red dyestuff [1 Co atom+2 molecules of (1-amino-2-hydroxy-5-methyl sulphonyl benzene→2-hydroxynaphthalene)]
3 parts of sodium alginate,
20 parts of ethylene glycol monoethyl ether,
5 parts of copra fatty acid dihydroxypropylamide, and
962 parts of water.

The impregnated slubbing is squeezed out until the increase in weight is 60% of that of the original and is then immediately steamed with saturated steam at 100° C. for 90 seconds. The goods are then passed for 30 seconds through a 60° C. warm development bath which contains 2 g. of 85% formic acid and 40 g. of butyl alcohol per litre. The goods are then washed and rinsed as described in Example 1. A strong wine red dyeing is obtained.

*Example 3*

Wool slubbing is impregnated as described in Example 2 but the impregnated and squeezed out goods are immediately dried in a lay-on-air dryer and then treated for one minute in a lightly boiling acid development bath which contains 2 g. of 85% formic acid and 40 g. of β-phenoxyethanol per litre. The goods are then washed and rinsed as described in Example 1. A strong wine red dyeing is obtained.

The same results are obtained is o-, m- or p-toluyloxyethanol or 2.5-, 2.4- or 3.4-xylyloxyethanol are used instead of β-phenoxyethanol.

*Example 4*

Woollen piece goods are impregnated as described in Example 1 with a 55° C. warm liquor which contains 50 parts of the yellow monoazo dyestuff [anthranilic acid decyl ester→1-(4'-methyl-2'-sulphophenyl)-3-methyl-5-pyrazolone],
2 parts of sodium alginate,
15 parts of n-butyl alcohol,
5 parts of dispersing agent as in Example 1, and
928 parts of water.

The acid development bath contains 8 g. of 85% formic acid and 600 g. of n-butyl alcohol per litre and the goods are in the bath for one minute. They are then washed and rinsed as described in Example 1. A strong yellow dyeing is obtained.

*Example 5*

The procedure is as described in Example 1 but the 55° C. warm impregnating liquor contains 30 parts of the blue dyestuff 1,4-bis-(2',6'-dimethylphenylamino)-anthraquinone sulphonic acid (sodium salt),
5 parts of sodium alginate,
5 parts of isoamyl alcohol,
20 parts of dispersing agent as in Example 1, and
940 parts of water.

The lightly boiling acid development bath contains 2 g. of 97.7% sulphuric acid and 60 g. of isoamyl alcohol. The goods are in the bath for 1 minute and are then washed and rinsed as described in Example 1. A strong blue dyeing is obtained.

*Example 6*

Dry wool slubbing is impregnated as described in Example 2 but the impregnating liquor, which is at 50° C. contains 15 parts of the orange dyestuff [1 Cr atom+2 molecules of (1-amino-2-hydroxy-5-ethyl sulphonyl benzene→1-phenyl-3-methyl-5-pyrazolone],
5 parts of sodium alginate,
20 parts of ethylene glycol monoethyl ether,
10 parts of dispersing agent as described in Example 1, and
950 parts of water.

The 60° C. warm acid development bath contains 2 g. of 85% formic acid and 40 g. of benzyl alcohol per litre and the goods are passed through in 30 seconds. The goods are then washed and rinsed as described in Example 1. A strong orange dyeing is obtained.

*Example 7*

Wool gabardine is treated in the foulard at 50° C. with a liquor consisting of 115 parts of Acid Milling Blac B (Schultz-Lehman Dyestuff Tables, 7th Edition (1931), No. 594),
5 parts of sodium alginate,
5 parts of benzoyl alcohol,
30 parts of copra fatty acid diethanolamide, and
845 parts of water.

The fabric, which has been immediately dried, is then passed for one minute through a lightly boiling bath containing 8 g. of 85% formic acid and 60 g. of benzyl alcohol per litre. The goods are then washed, rinsed and dried as described in Example 1. A strong black dyeing is obtained.

*Example 8*

Nylon piece goods are treated in the foulard at 50° C. with a solution consisting of 37.5 parts of the red diazo dyestuff from tetrazotised 2,2'-diamino-4.4'-dichlorodiphenyl sulphide and 2-amino-8-hydroxynaphthalene coupled acid,
5.0 parts of sodium alginate,
5.0 parts of benzyl alcohol,
5.0 parts of copra fatty acid diethanolamide, and
947.5 parts of water.

The fabric is squeezed out between rubber rollers until the increase in weight is 75% of that of the original and is then immediately dried in a dry-on-air dryer. It is then passed for 1 minute through a lightly boiling acid development bath which contains 2 g. of 85% formic acid and 60 g. of benzyl alcohol per litre. The fabric is then washed, rinsed and dried. A very level, fast, red dyeing is obtained.

*Example 9*

Dry Perlon slubbing is impregnated as described in Example 1 with an impregnating liquor consisting of:

15 parts of the yellow monoazo dyestuff [anthranilic acid-decyl-ester→1 - (2' - chloro-5'-sulphonyl)-3-methyl-5-pyrazolone],
20 parts of ethylene glycol monoethyl ether,
5 parts of sodium alginate,
10 parts of dispersing agent according to Example 1.

The goods are squeezed out and then treated for 1 minute in a lightly boiling acid development bath which contains 2 g. of formic acid 85% and 60 g. of benzyl alcohol per litre. In this way a strong yellow dyeing is obtained.

The following neutral to weakly acid drawing wool dyestuffs can also be used for example in the process described in Examples 1 to 9 above.

To attain:

*Yellow—*
(1) Monoazo dyestuff from diazotised 1-amino-3-(4,6-bis-phenylamino - 1,3,5 - triazinyl-2)-aminobenzene - 6 - sulphonic acid→1-(3'-chlorophenyl)-3-methyl-5-pyrazolone.
(2) Disazo dyestuff from tetrazotised 4-(3'-amino-benzoyl)-N-(2-phenoxyethyl)-amino - 1 - aminobenzene⇌2 mols of 1-(2'-chloro-5'-sulphophenyl)-3-methyl-5-pyrazolone.
(3) 1 atom chromium: two molecules dyestuff complex from 2-aminobenzene-1-carboxylic acid-5-sulphonic acid oxethylamide→1-(4'-chlorophenyl)-3-methyl-5-pyrazolone.
(4) 1 atom cobalt: two molecules dyestuff complex from 4-methyl sulphonyl-2-amino-1-hydroxybenzene→1-phenyl-3-methyl-5-pyrazolone.
(5) 1 atom cobalt: two molecules dyestuff complex from 2-amino-1-hydroxybenzene-4-sulphonic acid methylamide→acetoacetylaminobenzene.
(6) 1 atom chromium: one molecule dyestuff complex from diazotised 2-aminobenzoic acid→1-phenyl-3-methyl-5-pyrazolone and 2-hydroxybenzene-1-carboxylic acid-5-sulphonic acid anilide.

*Orange—*
(1) 1 atom chromium: two molecules dyestuff complex from 4-methyl sulphonyl-2-amino-1-hydroxy-benzene→1-phenyl-3-methyl-5-pyrazolone.
(2) Disazo dyestuff from tetrazotised benzidine⇌1 mol phenol and 1 mol 2-aminonaphthalene-3,6-disulphonic acid, esterified with p-toluene sulphonic acid chloride.
(3) Disazo dyestuff from tetrazotised 1,1-bis-(4'-aminophenyl)-cyclohexane⇌1 mol phenol and 1 mol 2-aminonaphthalene-3,6-disulphonic acid.

*Red—*
(1) Disazo dyestuff from benzidine⇌1 mol phenol and 1 mol 2-hydroxynaphthalene-3,6-disulphonic acid, esterified with p-toluene sulphonic acid chloride.
(2) Monoazo dyestuff from diazotised 4-chloro-2-aminodiphenyl ether→1-p-toluene sulphonyl amino-8-hydroxynaphthalene-3,6-disulphonic acid.
(3) 1 atom chromium: two molecules dyestuff complex from 6-nitro-4-methyl-2-amino-1-hydroxybenzene→1-(2' - methyl - 5' - sulphamidophenyl)-3-methyl-5-pyrazolone.

*Bordeaux*—1 atom chromium: 1 molecule dyestuff complex from diazotised 4-ethyl sulphonyl-2-amino-1-hydroxybenzene→2-hydroxynaphthalene and 2-hydroxybenzene-1-carboxylic acid-5-sulphonic acid anilide.

*Brown*—
(1) 1 atom chromium: two molecules dyestuff complex from 4-nitro-2-amino-1-hydroxybenzene→4-methyl-2-acetylamino-1-hydroxybenzene.
(2) 1 atom cobalt: two molecules dyestuff complex from 4-nitro-2-amino-1-hydroxybenzene→4-methyl-1-hydroxybenzene.

*Blue*—
(1) 4.4'-bis-(4-amino-3 - sulphoanthraquinonyl - 1-amino)-diphenyl methane.
(2) 1 atom chromium: two molecules dyestuff complex from 2-amino-1-hydroxybenzene-4-sulphonic acid methylamide→1-hydroxy - 5,8-dichloronaphthalene.
(3) 1 atom chromium: two molecules dyestuff complex from 5-nitro-4-chloro-2-amino-1-hydroxybenzene→1-hydroxynaphthalene-3,6-disulphonic acid amide.
(4) Disazo dyestuff 1-aminobenzene-3-sulphonic acid-4'-sulphophenol ester→1-aminonaphthalene→1-phenylaminonaphthalene-8-sulphonic acid.
(5) 1 atom cobalt: two molecules dyestuff complex from 5-nitro-2-amino-1-hydroxybenzene→2-aminonaphthalene-6-sulphonic acid amide.
(6) 1-cyclohexylamino-4-(2',6'-dimethyl - 4' - phenoxyphenylamino)-anthraquinone sulphonic acid (sodium salt).
(7) 1,4 - bis - (2',4',6' - trimethylphenylamino) - anthraquinone disulphonic acid.

*Green*—
(1) 1,4-bis-(4'-phenoxyphenylamino)-anthraquinone disulphonic acid (sodium salt).
(2) 1 atom chromium: 1 molecule dyestuff complex from 5-nitro-2-amino-1-hydroxybenzene→2-aminonaphthalene+2-hydroxybenzene - 1 - carboxylic acid-5-sulfonic acid phenylamide.
(3) 1 atom chromium: 1 mol dyestuff complex from 5-nitro-2-amino - 1 - hydroxybenzene→2-(2'-carboxyphenylamino)-naphthalene+2 - hydroxybenzene-1-carboxylic acid.

*Grey*—1 atom chromium: two molecules dyestuff complex from 4-ethyl sulphonyl-2-amino-1-hydroxybenzene→1-methyl sulphonylamino-7-hydroxynaphthalene.

*Grey-black*—
(1) 1 atom chromium: two molecules dyestuff mixed complex from 6-nitro-2-hydroxy-1-diazonaphthalene-4-sulphonic acid→2-hydroxynaphthalene and 4,6 - dinitro-2-diazo - 1 - hydroxybenzene→2-hydroxynaphthalene.
(2) 1 atom chromium: two molecules dyestuff mixed complex from 1-diazo-2-hydroxynaphthalene-4-sulphonic acid→2-hydroxynaphthalene and 4-chloro-1-diazobenzene→5-methyl - 2 - hydroxy-1-aminobenzene→2-hydroxynaphthalene.

What we claim is:

1. A process for the dyeing of polypeptide fibres with neutral to weakly acid drawing wool dyestuffs, said process comprising the steps of (a) impregnating the polypeptide fibres at a temperature within the range of from room temperature to 70° C. with a liquor containing at least one of said neutral to weakly acid drawing wool dyestuffs, (b) squeezing out excess dye liquor from the impregnated goods by pressing and (c) developing the dyeing by the application of an acid shock by entering the impregnated goods into an at least 50° C. hot developing bath containing dilute acid and, as solvent for the dye, benyl alcohol, and withdrawing the developed dyeing from said developing bath at the end of a period of at most five minutes, whereby the dyeing operation can be carried out in continuous manner.

2. A process according to claim 1 wherein the dye liquor also contains a thickener and a condensation product of fatty acids having 8 to 16 carbon atoms with alkanolamines.

3. A process for the dyeing of polypeptide fibres selected from the group consisting of wool and synthetic polyamide fibres with a neutral to weakly acid drawing metal-containing dyestuff which contains two dyestuff molecules in complex union with said metal, said metal being selected from the group consisting of chromium and cobalt, said process comprising the steps of (a) impregnating the polypeptide fibres at a temperature within the range of from room temperature to 70° C. with a liquor containing at least one of said neutral to weakly acid drawing dyestuffs and a thickener and a condensation product of fatty acids having 8 to 16 carbon atoms with alkanolamines, (b) squeezing out excess dye liquor from the impregnated goods by pressing and (c) developing the dyeing by the application of an acid shock by entering the impregnated goods into an at least 50° C. hot developing bath containing dilute acid and, as solvent for the dye, benzyl alcohol, and withdrawing the developed dyeing from said developing bath at the end of a period of at most five minutes.

4. A process for the dyeing of polypeptide fibres selected from the group consisting of wool and synthetic polyamide fibres with a neutral to weakly acid drawing acid milling dyestuff, said process comprising the steps of (a) impregnating the polypeptide fibres at a temperature within the range of from room temperature to 70° C. with a liquor containing at least one of said neutral to weakly acid drawing dyestuffs and a thickener and a condensation product of fatty acids having 8 to 16 carbon atoms with alkanolamines, (b) squeezing out excess dye liquor from the impregnated goods by pressing and (c) developing the dyeing by the application of an acid shock by entering the impregnated goods into an at least 50° C. hot developing bath containing dilute acid and, as solvent for the dye, benzyl alcohol, and withdrawing the developed dyeing from said developing bath at the end of a period of at most five minutes, whereby the dyeing operation can be carried out in continuous manner.

5. A process for the dyeing of polypeptide fibres with neutral to weakly acid drawing wool dyestuffs, said process comprising the steps of (a) impregnating the polypeptide fibres at a temperature within the range of from room temperature to 70° C. with a liquor containing at least one of said neutral to weakly acid drawing wool dyestuffs, (b) squeezing out excess dye liquor from the impregnated goods by pressing and (c) developing the dyeing by the application of an acid shock by entering the impregnated goods into an at least 50° C. hot developing bath containing dilute acid and, as solvent for the dye, benzyl alcohol, the concentration of the benzyl alcohol in the acid developing bath being at the saturation point of the solubility of benzyl alcohol in water, and withdrawing the developed dyeing from said developing bath at the end of a period of at most five minutes, whereby the dyeing operation can be carried out in continuous manner.

References Cited in the file of this patent

UNITED STATES PATENTS

| | | |
|---|---|---|
| 2,552,404 | Casty | May 8, 1951 |
| 2,888,313 | Mauntner | May 26, 1959 |
| 2,890,094 | Tucker | June 9, 1959 |

OTHER REFERENCES

Ser. No. 391,542, Mueller (A.P.C.), published April 27, 1943.